United States Patent
Chou et al.

(10) Patent No.: US 7,346,044 B1
(45) Date of Patent: **\*Mar. 18, 2008**

(54) NETWORK ADDRESS TRANSLATION FOR VOICE OVER INTERNET PROTOCOL ROUTER

(75) Inventors: Chih-Hsiang Chou, Cupertino, CA (US); Janardhana Reddy, Sinagpore (SG); Wee Sin Tam, Singapore (SG); Poh Yoke Lai, Singapore (SG); Halim Md Noor, Singapore (SG); Sin Ming Ow, Singapore (SG)

(73) Assignee: MediaRing Ltd., Singapore Post Centre (SG)

( * ) Notice: Subject to any disclaimer, the term of this patent is extended or adjusted under 35 U.S.C. 154(b) by 1289 days.

This patent is subject to a terminal disclaimer.

(21) Appl. No.: 10/271,183

(22) Filed: Oct. 14, 2002

Related U.S. Application Data

(60) Provisional application No. 60/338,077, filed on Nov. 30, 2001, provisional application No. 60/329,015, filed on Oct. 12, 2001.

(51) Int. Cl.
*H04L 12/66* (2006.01)
(52) U.S. Cl. ............... 370/352; 370/354
(58) Field of Classification Search ........ 370/352–356, 370/401, 462–466
See application file for complete search history.

(56) References Cited

U.S. PATENT DOCUMENTS 6,446,127 B1 * 9/2002 Schuster et al. ............ 709/227
6,678,283 B1   1/2004 Teplitsky
6,687,245 B2   2/2004 Fangman et al.
7,068,647 B2   6/2006 Fangman et al.
2001/0032270 A1   10/2001 Koo

OTHER PUBLICATIONS

"A Primer on the H.323 Series Standard", DataBeam Corporation, Version 2.0, May 15, 1998, Lexington, KY, U.S.A.

* cited by examiner

*Primary Examiner*—Suhan Ni
(74) *Attorney, Agent, or Firm*—Fenwick & West LLP

(57) ABSTRACT

A network address translation apparatus and method within a Voice over Internet Protocol (VoIP) router is described. This apparatus and method operates within networking devices such as routers, switches, bridges, etc. These devices masks both source and destination addresses and may either replace or complement a firewall in providing security. According to one embodiment, network type information, corresponding to the gateways within connection, is embedded in a port number within a packet header. This network type information is extracted and analyzed to identify the network types of both gateways within the connection. According to another embodiment, a port number is assigned according to the network types of both gateways within a connection. Thus, this network type information may be identified by processing the port number on which a packet is received.

17 Claims, 15 Drawing Sheets

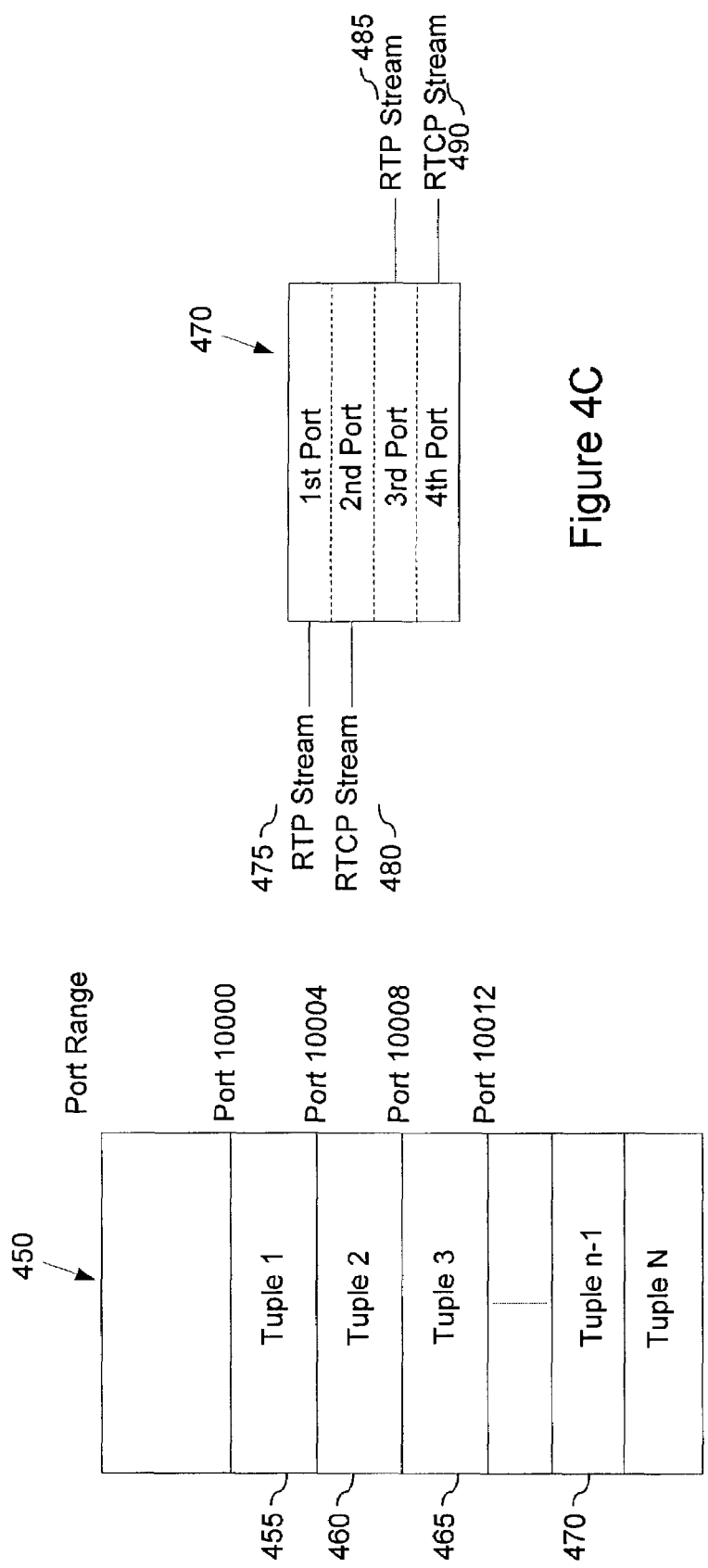

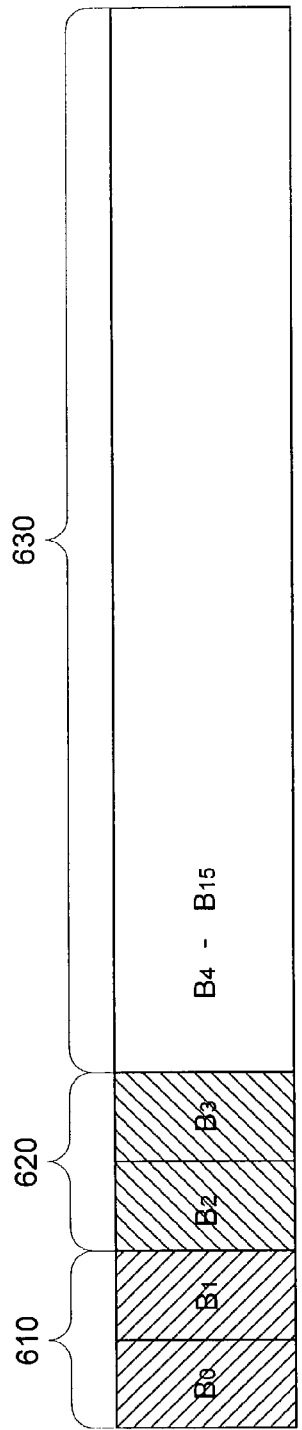

| Gateway Type for Smaller IP Address | Gateway Type for Larger IP Address | Starting Voice Router Port | Ending Voice Router Port (or Length) |
|---|---|---|---|
| Gateway Type (1) | Gateway Type (1) | 1000 | 2000 |
| Gateway Type (1) | Gateway Type (2) | 3000 | 4000 |
| Gateway Type (2) | Gateway Type (1) | 5000 | 5500 |
|  |  |  |  |
| Gateway Type (N) | Gateway Type (N-1) | 60000 | 62000 |

| Source IP Address | Network Type |
|---|---|
| Gateway (1) | Type (1) |
| Gateway (2) | Type (1) |
| Gateway (3) | Type (4) |
| Gateway (4) | Type (2) |

700B
760 — Source IP Address   762 — Network Type
764 — Gateway (2)

Figure 7B

NETWORK ADDRESS TRANSLATION FOR VOICE OVER INTERNET PROTOCOL ROUTER

RELATED APPLICATIONS

This application is related to provisional application Ser. No. 60/338,077, filed Nov. 30, 2001, entitled "Network Address Translation for Voice over Internet Protocol Router" and provisional application Ser. No. 60/329,015 filed Oct. 12, 2001, entitled "Gateway Type Identification within a VoIP Connection" from which priority is claimed under 35 U.S.C. § 119(e) and which applications are incorporated by reference.

BACKGROUND

A. Technical Field

The present invention relates generally to network address translation, and more particularly, to address translation of voice packets within a Voice over Internet Protocol (VoIP) connection.

B. Background of the Invention

The popularity of VoIP as a method for providing telephone service across networks is continually increasing. VoIP systems provide telephone connections by transmitting audio packets between two telephone devices via a packet-switched network (e.g., TCP/IP network). This increase in VoIP popularity is primarily due to two reasons: the relatively inexpensive cost of a VoIP telephone call and recent networking advancements causing an increase in the quality of VoIP communication.

VoIP lets service providers offer long-distance services to clients at much lower rates than traditional phone companies. VoIP also uses networks more efficiently than the traditional public switched telephone network used by the traditional phone companies. One reason for this increase in efficiency is the ability of VoIP to time-division multiplex voice data (i.e., telephone connections) together on a single line within a network. Thus, the bandwidth utilization increases within a packet switched network allowing more telephone connections to occur simultaneously.

A few years ago, the quality of a VoIP connection was lacking due primarily to packet delay occurring as voice packets traveled across these networks. This problem was primarily caused by the inefficiency of the Internet over which the VoIP connections occurred. Internet events such as bottlenecks, jitters and discarding packets reduced the quality of a VoIP telephone conversation occurring across the Internet. However, the increase of large private networks, more controlled Internet backbones, and more efficient routing protocols have greatly reduced these problems. Accordingly, the quality of a VoIP telephone conversation today has drastically improved. Some providers have also chosen to avoid the public Internet because of the difficulty in ensuring end-to-end control of service quality. These providers have created managed networks on which VoIP connections may be easily controlled and new VoIP technology may be more easily implemented. As the popularity of VoIP continues to grow, other issues need to be addressed, such as security, network interoperability and compatibility, to ensure the future success of VoIP.

FIG. 1 illustrates a traditional VoIP connection using the public Internet 130. A first telephone 105 is coupled to a first gateway 110 via a first analog connection 107. A second telephone 115 is coupled to a second gateway 120 via a second analog connection 117. A computer or other computing device (not shown) may reside between the telephones 105, 115 and the gateways 110, 120. Accordingly, the analog signal from the telephone 105, 115 is converted to a digital format by these computers (not shown). The first gateway 110 and the second gateway 120 are coupled to each other via the Internet 130. Additionally, the telephones 105, 115 may be digital telephones, such as ISDN phones or VoIP phones, that convert an audible signal to a digital signal prior to transmission to a gateway. A gatekeeper 140 may be used to set up the telephone connection.

The telephone connection is established by the first gateway 110 receiving a connection request from the first telephone 105 that includes a destination telephone number. This destination telephone number may be a ten-digit telephone number similar to those used over traditional publicly switched telephone networks. In response, the first gateway 110 requests a destination network address from the gatekeeper 140 corresponding to the destination telephone number. This conversion allows the first gateway 110 to locate the second gateway 120 on the Internet 130. Typically, this conversion results in a network address, such as an IP address that differentiates the second gateway 120 from other gateways on the Internet 130.

A set-up procedure is initiated by the first gateway 110 in which the second gateway 120 is provided the address of the first gateway 110. This set-up procedure results in a connection on which data, particularly voice packets and control data, are transmitted between the gateways 110, 120. This data may travel through multiple networks and multiple routers/switches within these networks in order to reach the correct destination. As described above, oftentimes the quality of this connection is lacking due to the characteristics of the Internet 130. Congestion and failures, within these networks, may drastically reduce the rate at which this data travels in an established connection and may increase the number of packets that are lost or discarded prior to reaching a particular destination address.

The established connection between the first gateway 110 and the second gateway 120 presents various security concerns. A large number of these issues are caused by the visibility of the gateways 110, 120 within the connection. Specifically, the IP addresses of the gateways 110, 120 are known by each other. This visibility compromises the security of all of the devices attached to a network having a visible gateway. Accordingly, a hacker may access devices on the network, other than the telephone or computer participating in the connection, through the gateways 110, 120. For example, after gaining access to the network through a gateway 110, 120, a hacker may access an unauthorized networked device through techniques such as IP spoofing or other commonly used hacking methods. Accordingly, network providers prefer to mask their gateway addresses from outside devices in order to further secure the network against hacking and other unauthorized access to their networks.

FIG. 2 illustrates the use of prior art proxies 235, 240 to mask gateway addresses within a VoIP connection. An example of these types of proxies would be a firewall such as the Cisco PIX firewall. Other network devices such as proxy servers and SOCK (TCP/IP Socket) servers may be used to build firewalls or other masking devices. Network security problems (e.g., hacking) are amplified when a publicly accessible or visible gateway is connected as part of a larger private network. The visibility of a gateway may allow individuals to hack into the large private network and cause a large amount of damage by accessing other devices connected to the network. Oftentimes, a device on a network, such as storage and computing devices, is not sufficiently protected from access within the network. Thus, if a hacker gains access to a network through a gateway, then other devices on that network may be extremely vulnerable and easily accessed by the hacker. Accordingly, private network operators prefer that internal gateway addresses be hidden from external network devices, such as external gateways. Proxies are used to accomplish this goal.

The first telephone 105 is connected to a first network gateway 212(a) via first analog connection 107. This first network gateway 212(a) resides in a large private network 210 that contains multiple gateways 212(a)-(d). The second telephone 115 is connected to a second network gateway 222(a) via second analog connection 117. This second network gateway 222(a) resides in a second large private network 220 that also contains multiple gateways 222(a)-(d). The first gateway 212(a) is coupled to a first proxy 235 and the second gateway 222(a) is coupled to a second proxy 240.

The first and second proxies 235, 240 hide the addresses of the first and second gateways 212(a), 222(a) from each other. Specifically, the first proxy 235 is aware of the network addresses of the first gateway 212(a) and the second proxy 240, but not the second gateway 222(a). The second proxy 240 is aware of the network addresses of the second gateway 222(a) and the first proxy 235, but not the first gateway 212(a). Thus, communication between devices on the first network 210 and the second network 220 occur through the proxies 235, 240 while maintaining a level of privacy from each other.

The first and second proxies 235, 240 require that packets traveling through the VoIP connection may be modified multiple times. Specifically, in order for the first and second proxies 235, 240 to extract and analyze information from a packet header (e.g., port number). Once this information is extracted, a new header is usually put on the packet and it is compressed. Thereafter, the packet is transmitted from a proxy. Because voice packets travel through multiple proxies 235, 240, the number of packet manipulation operations increases. Thus, there is a need to reduce the number of proxy devices within a VoIP connection. This need is further highlighted by the high cost of networking devices such as proxy devices.

Communication between the first proxy 235 and the second proxy 240 may occur using an IP suite protocol implementing either TCP or UDP depending on the type of data within packets. UDP is generally used for VoIP telephone connections due to the time sensitivity of the VoIP connection. Accordingly, sockets are established between the first and second proxies 235, 240. A socket is a combination of an IP address and a port that creates a device-to-device path on which packets may be transmitted and received. Thus, a proxy or other networking device may have numerous ports that provide communication paths on which packets may travel.

Oftentimes, a simple packet translation method will not properly switch a voice packet along a VoIP connection. For example, this switching process may be complicated if the networks on which the first and second gateways 212(a), 222(a) are not directly compatible. Generally, voice traffic is transmitted according to the H.323 standard, an ITU real-time standard for transmission of voice over networks. However, there are variations in the implementation of the H.323 standard by network providers that may cause incompatibilities between networks. These variations often require packet modification operations to occur within a proxy to provide smooth voice traffic between the incompatible networks.

In order to perform packet translation and switching operations in connections between to directly incompatible networks, a proxy must be able to identify the type of network from which the packet was sent and to which the packet is destined. Also, the proxy must be able to identify the packet type (e.g., RTP) in order to perform packet translation and switching operations. Once this information is identified, the proxy may modify the packet so that it is able to effectively travel through a network to a destination gateway.

As previously described above, it is important to try and reduce the number of switches, routers and other networking devices within a VoIP connection for two primary reasons. First, networking devices are expensive and the initial cost as well as the management cost may be significant. Second, each networking device increases the possibility of errors such as packets being discarded or failure as well as causes an additional delay within a VoIP connection. As a result, researchers have been developing technology that reduces the number of networking devices within a network.

Accordingly it is desirable to provide network address translation within a network device that masks both ends of a VoIP connection from each other. Additionally, it is desirable to provide network address translation within a network device that facilitates VoIP connections between different types of networks and that processes different types of packets within a VoIP connection. Furthermore, it is desirable to provide network address translation within a network device that increases the number of VoIP connections that may be served by the network device.

SUMMARY OF THE INVENTION

The present invention overcomes the deficiencies and limitations of the prior art by providing an apparatus and method that provides a VoIP connection and reduces the number of ports in the connection by performing a novel network address translation on packets traveling along this connection. In particular, the network address translation includes a process that identifies the network type for each independent gateway within the connection and a process that identifies the direction of a packet arriving on a port serving both gateways within the connection.

The present invention may operate in a voice router comprising a voice switch and a voice connector. The voice connector establishes a VoIP connection between a first independent network gateway and a second independent network gateway. These gateways interface large public networks to local area networks (both public and private) containing telephonic devices such as VoIP telephones or computers on which users may communicate. The voice connector defines sockets that create this VoIP connection by assigning a port number(s) to devices within the connection. In one such instance, the voice connector assigns at least one port number to the voice switch on which communication between the two gateways will traverse.

The voice connector comprises a network address translation process that internally accesses a port initialization mechanism and a network type identification module. In particular, the voice connector receives a call set-up request from a source gateway and translates, from that request, a destination network address to a terminating gateway. In this translation process, the types of networks on which both gateways reside are identified so that an accurate translation occurs. Also, port numbers are assigned to create the connection on which packets will travel. According to one embodiment, the actual assigned port number relates to the network type of each of the gateways. Once this connection is established, the voice switch is able to switch or route packets between the two gateways as a conversation takes place. According to one embodiment, this switching of voice packets occurs in accordance with the International Telecommunication Union (ITU) H.323 standard.

The voice switch effectively masks the two independent gateways from each other by performing a translation process on packets arriving from each gateway. Specifically, the voice switch removes header information from an incoming packet and inserts new information into the outgoing packet header such as a new destination address and port number. Thereafter, the packet is transmitted from the voice switch to the correct gateway.

The voice switch comprises a network type identification module, a packet direction identification module, and a packet translation module. The voice switch is able to enhance the connection quality and reduce the number of ports by identifying the types of gateways and direction of packets from data within the packet itself. According to one embodiment, the voice switch receives data from both gateways on a single port. Using information within the header of a packet, the voice switch is able to identify the direction that the packet is traveling and the types of gateways within the connection on which the packet is traveling. These processes allow the voice switch to properly translate the packet header and forward the packet onto the correct destination. According to another embodiment, the voice switch identifies the network types of the gateways by analyzing the port on which a packet arrives. As discussed above, during a call set-up, the actual port number assigned to a connection depends on the network types of both gateways. Thus, the voice switch can identify these network types by analyzing the actual port on which a packet arrives.

The features and advantages described in this summary and the following detailed description are not all-inclusive, and particularly, many additional features and advantages will be apparent to one of ordinary skill in the art in view of the drawings, specification, and claims hereof.

BRIEF DESCRIPTION OF THE DRAWINGS

FIG. 4B is an illustration of an exemplary port allocation range used within a voice router during a VoIP connection.

FIG. 4C is an illustration of a port grouping (tuple) used for port allocation.

FIG. 6A is an illustration of network type identifiers within a port number field.

FIG. 6B is an exemplary table of bits corresponding to network types.

FIG. 7A is an illustration of an exemplary network pair table that may be used to identify network types of gateways in a VoIP connection.

FIG. 7B is an illustration of an exemplary network type table for associating an IP address with a network type.

The figure depict a preferred embodiment of the present invention for purposes of illustration only. One skilled in the art will recognize from the following discussion that alternative embodiments of the structures and methods illustrated herein may be employed without departing from the principles of the invention described herein.

DETAILED DESCRIPTION OF THE PREFERRED EMBODIMENTS

The present invention describes a network router/bridging device that interfaces networks within a VoIP connection and masks the location of each network from the other. This device is able to interface networks implementing different H.323 interpretations (or SIP protocol) and reduces the number of ports required for this connection. Specifically, the device provides a novel network address translation module and network-type identification module that facilitates a VoIP connection between these networks. The novel network address translation module increases the number of VoIP connections the networking device may route or switch by reducing the number of ports required for each individual connection. According to one embodiment of the invention, only one port on the networking device is required for each VoIP connection. This reduction in the number of required ports is provided by an address translation that is able to set-up a VoIP connection on a single port that determines the direction of a packet received at a single bi-directional port and able to identify the type of network to which the packet is destined.

A. VoIP Connection Using a Single Voice Router

Figure 1:
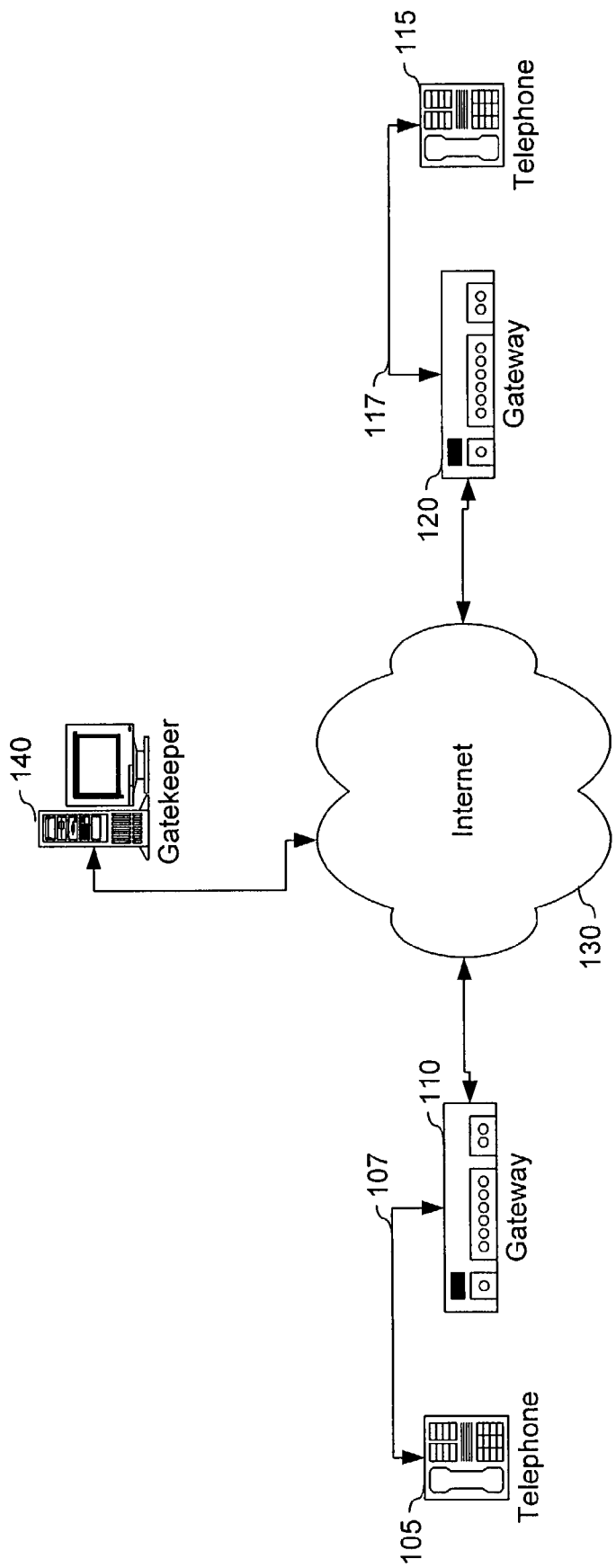
FIG. 1 is an illustration of a prior art VoIP connection using the Internet.
Figure 2:
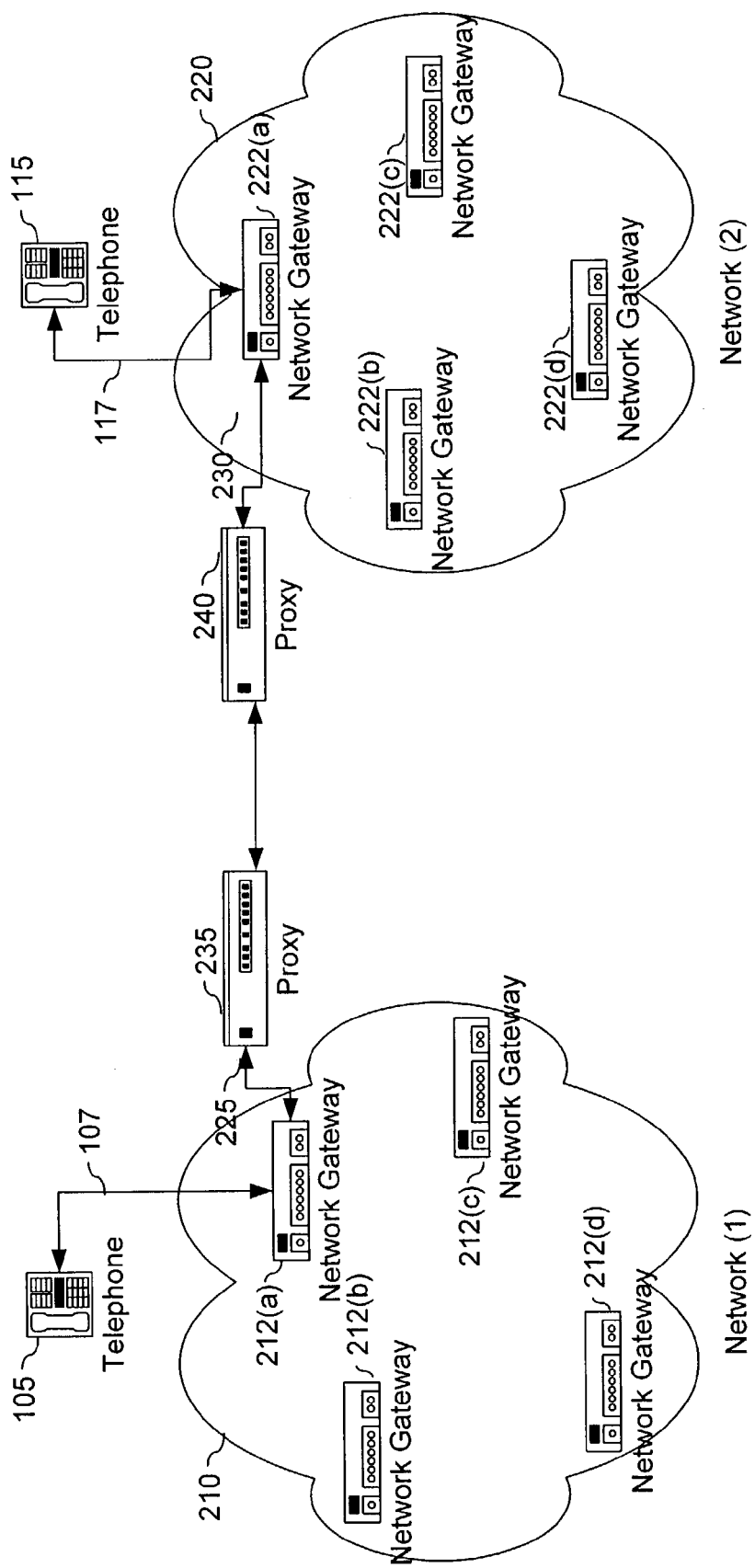
FIG. 2 is an illustration of a prior art VoIP connection using multiple proxies.
Figure 3:
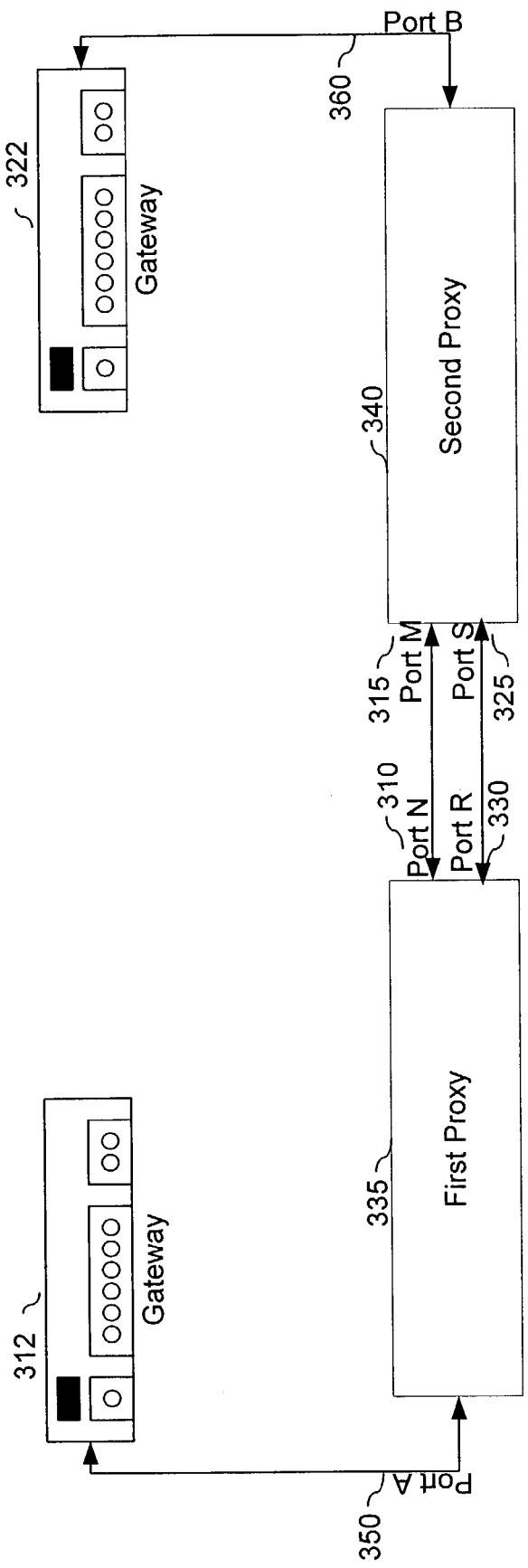
FIG. 3 is an illustration of communication ports between multiple proxies within a VoIP connection.

FIG. 3 illustrates a first embodiment of proxies 335, 340 that connect two gateways 312, 322 within a VoIP connection. A first gateway 312 is coupled to a first proxy 335. A second gateway 322 is coupled to a second proxy 340. The first proxy 335 is coupled to the second proxy 340. The proxies 335, 340 effectively mask the two IP addresses of the gateways 312, 322 from each other during both the set-up of the VoIP connection and after the VoIP connection has been established.

A first port configuration according to the present invention between the two proxies 335, 340 is shown. Audio communication between the two proxies 335, 340 occurs over 4-four ports. A first port, port N 310, receives Real-time Transport Protocol (RTP) packets at the first proxy 335 from the second proxy 340. A second port, port M 315, receives RTP packets at the second proxy 340 from the first proxy 335. Ports N 310 and M 315 may also be assigned the same port number or different port numbers depending on the implementation of the connection. A third port, port R 330, receives Real-time Transport Control Protocol (RTCP) packets at the first proxy 335 from the second proxy 340. A fourth port, port S 325, receives RTCP packets at the second proxy 340 from the first proxy 335. Port R 330 and port S 325 may be assigned the same port number or different port numbers depending on the implementation of the connection. Each of these ports (i.e., N, M, R, and S) along with an IP address of a corresponding proxy (i.e., 335 or 340) creates a socket on which packets flow. Thus, the proxies 335, 340 may identify the source of a packet by listening on the specific port number corresponding to the transmitting source. The proxies 335, 340 have a limited number of ports and addresses that they may use. Accordingly, as the number of ports that are used for each connection increases, the number of total connections that a proxy can serve decreases.

After one of the proxies 335, 340 receives a packet, it will forward the packet onto a corresponding gateway 312, 322 via an additional port. For example, a RTP voice packet received by the first proxy 335 on port N 310 is forwarded on to the first gateway 312 on port A 350. Comparatively, an RTP voice packet received by the second proxy 340 on port M 315 is forwarded on to the second gateway 322 on port B 360. A similar method is used for RTCP packets where packets transmitted onto port R 330 for the first proxy 335 and on port S 325 for the second proxy are forwarded onto a corresponding gateway via particular ports (not shown). The usage of ports by proxies and gateways can vary depending on the design of the private networks and network interconnectivity.

Figure 4A:
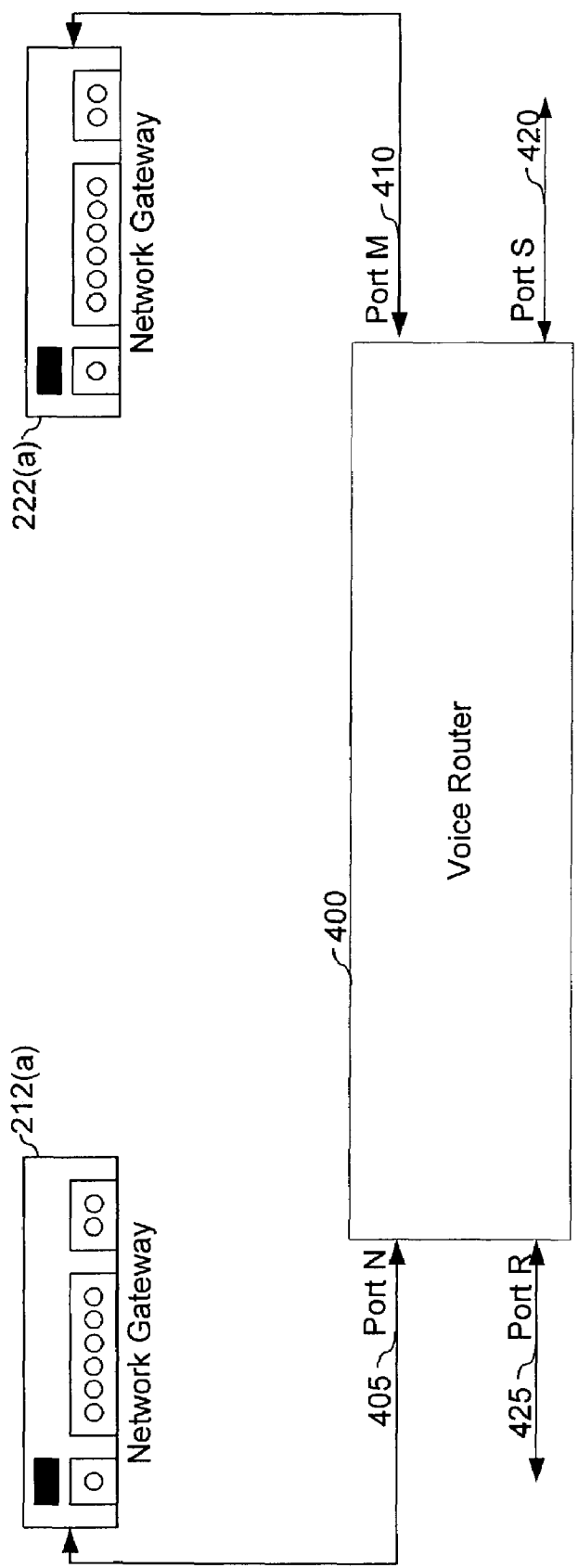
FIG. 4A is an illustration of a VoIP connection using a voice router and the corresponding IP ports on the voice router according to the present invention.

FIG. 4A illustrates a VoIP connection that implements a single voice router 400 to mask the addresses of the first network gateway 212(a) and the second network gateway 222(a), and facilitate the connection between the two gateways 212(a), 222(a). The term "voice router" is not limited to a traditional definition of a router; rather, a bridge, router, switch or other network interfacing device may be included in the scope of voice router according to the present invention. As mentioned above, these gateways 212(a), 222(a) may reside in either a public or private network. This particular voice router 400 uses four ports to transmit and receive voice packets between the two gateways 212(a), 222(a). RTP packets arriving from the first network gateway 212(a) are received on port N 405 of the voice router 400. The voice router 400 then forwards these packets onto the corresponding port (port M 410) at the second network gateway 222(a). RTP packets flowing in the opposite direction are received from the second network gateway 222(a) on port M 410 of the voice router. The voice router 400 forwards these packets onto the corresponding port at the first network gateway 212(a).

The voice router 400 also manages RTCP packet streams between the first and second network gateways 212(a), 222(a) in a similar manner. Specifically, RTCP packets from the first network gateway 212(a) arrive on port R 425 at the voice router 400. These packets are forwarded onto the corresponding port (port S 420) at the second network gateway 222(a). RTCP packets from the second network gateway 222(a) are received on port S 420 at the voice router 400. These packets are then forwarded onto the corresponding port (port R 425) at the first network gateway.

This embodiment of the present invention does not require the module responsible for the H.323 protocol (or SIP protocol), in particular the H.245 logical channel negotiation, to inform the voice router 400 of the IP addresses and ports used for both the gateways 212(a), 222(a). As a result, the information exchange between the H.323 protocol handling module and voice router 400 is reduced.

This four-port configuration allows the voice router 400 to identify the direction of the packet streams between the first network gateway 212(a) and the second network gateway 222(a) by the port on which a packet arrives. Packet direction is discovered by identifying the source of the packet and using the source identification to determine a destination corresponding to the source. Specifically, the voice router 400 is aware of the connections that it serves and may determine a destination of a packet by identifying the port on which the packet arrived. Additionally, the four-port configuration provides for communication between the two network gateways 212(a), 222(a) in two different protocols, namely RTP and RTCP. However, as described above, this high port count also limits the number of VoIP connections that the voice router 400 can support.

FIG. 4B illustrates an example of a port configuration according to the present invention. A range of IP ports 450 is shown that may be assigned for different types of packet transmission. For example, ports may be assigned to a VoIP connection and divided into ports that service RTP packets and others that service RTCP packets. A first tuple 455 may be assigned port values 10000 to 10003, a second tuple 1460 may be port values 10004 to 10007, and a third tuple 465 maybe assigned port values 10008 to 10011. These ports within the tuples 455, 460, 465 may be assigned to serve different types of data streams within the VoIP connection. Referring also to FIG. 4C, for example, a tuple 470 assigned to a VoIP connection may have a first port (e.g., port N) assigned for an RTP stream 475 to or from a first gateway 212(a) and a second port (e.g., port R) assigned for an RTCP stream to/from the first gateway 212(a). A third port (e.g., port M) may be assigned for an RTP stream 485 to/from a second gateway 222(a) and a fourth port (e.g., port S) may be assigned for an RTCP stream 490 to/from the second gateway 222(a). As a result, the port tuple 470 may serve both RTP and RTCP within a VoIP connection.

According to one embodiment, the ports may be assigned according to the types of networks involved in the VoIP connection. For example, if the voice router 400 is positioned between a private network and the public Internet, then the port assignment may occur in the following manner. The first port is pre-assigned for the RTP stream originating from a gateway on the public Internet. The second port is pre-assigned for the RTCP stream originating from the gateway on the public Internet. The third port is pre-assigned for the RTP stream originating from a gateway in the private network. The fourth port is pre-assigned for the RTCP stream originating from the gateway in the private network.

Referring to the above described port configuration, when the voice router 400 receives a first UDP packet of the RTP stream from the private network, it reads the source IP address and port number within the UDP packet. This address is the transmitting gateway's IP address and the port number is the port on which the packet arrived. In this example, the packet originated at a private network, and therefore, the port number would be the third port number within the tuple, as described above. This private gateway address is stored with the voice router 400 and will be used to transmit packets from the public Internet to the correct destination private network within the particular VoIP connection. A similar method may be used when an RTP packet arrives from the public Internet destined to a particular private network. As a result of this process, the voice router 400 is able to help create and maintain a VoIP connection.

a) Port Reduction on the Single Voice Router

Figure 5A:
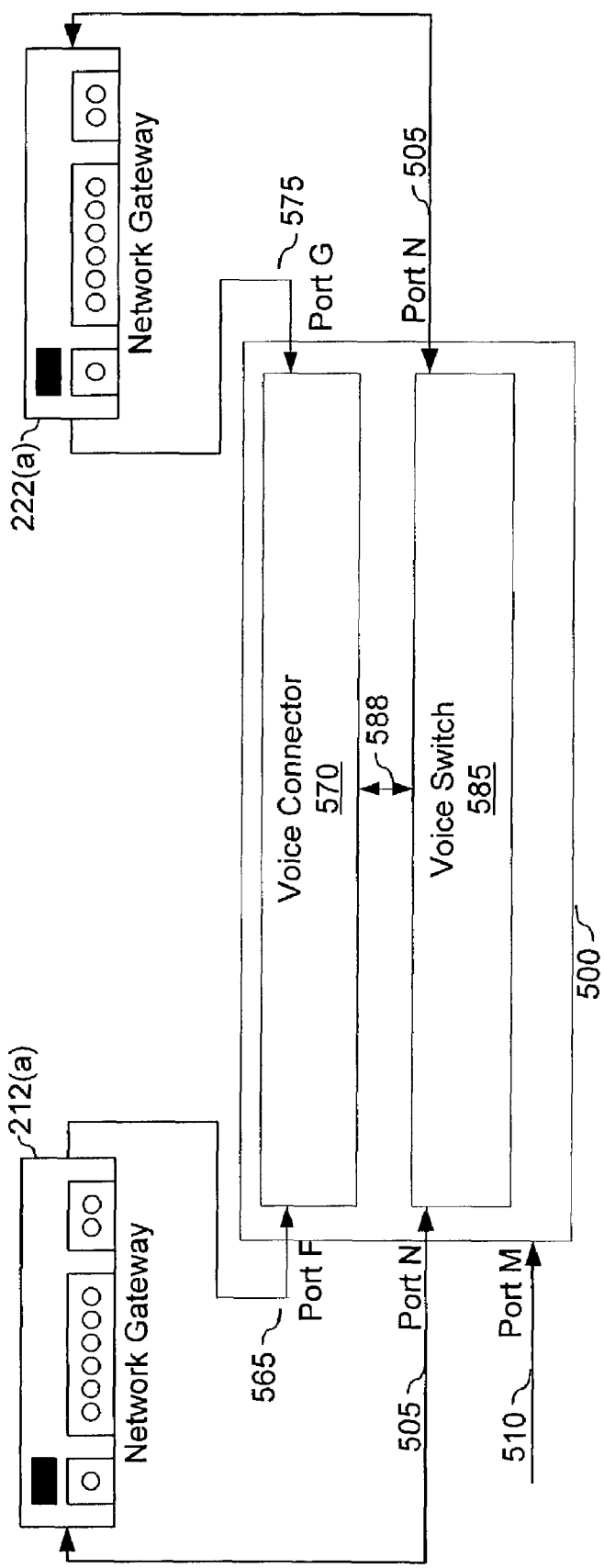
FIG. 5A is an illustration of a VoIP connection using a single voice router with a reduced number of IP ports.

FIG. 5A is an illustration of a voice router 500 having a voice switch 585 and a voice connector 570. According to another embodiment (not shown) of the present invention, the voice switch 585 and voice connector 570 may be physically separate. The voice switch 585 requires only two ports for each VoIP connection after the voice connector 570 establishes the connection. This voice switch 585 switches RTP voice packets between the first gateway 212(a) and the second gateway 222(a) on a single port N 505. However, those skilled in the art will recognize while only a single port is used, two sockets can be created. (The first socket is the IP address and port number of the first gateway 212(a) and the second socket is the same port N and the IP address of the second gateway 222(a)). In order for the voice switch 585 to accurately forward packets on to the correct destination (i.e., the first network gateway 212(a) or the second network gateway 222(a)) in the VoIP connection, the direction or source address of each packet must be identified. This identification requirement is complicated by the fact that the voice switch 585 is receiving data from both the first and second network gateways 212(a), 222(a) on the same port N 505. A solution to this identification requirement is later described in detail.

The voice connector 570 is used to set-up a VoIP connection. The voice connector 570 may be integrated within the voice switch 585, as shown in FIG. 5A, or physically separate from the voice switch 585. The voice connector 570 is connected to the first network gateway 212(a). The voice connector 570 is also connected to the second gateway network 222(a). A VoIP call set-up is initiated by either the first or second network gateways 212(a), 222(a) requesting a connection to the other network gateway. Typically, this request occurs on a particular port on the voice connector 570. For example, the first network gateway 212(a) may request a connection on port F 565. The second network gateway 222(a) may request a connection on port G 575. Port F 565 and port G 575 may have the same port number or have different numbers depending on the design and type of the first and second networks 212(a), 222(a). The voice connector 570 listens on port F 565 for call set-up requests from the first network gateway 212(a) and listens on port G 575 for call set-up requests from the second network gateway 222(a).

A call set-up request contains information regarding the desired VoIP connection including destination information such as an address. An address, such as a ten-digit telephone number, within this request is translated by the voice connector 570 into a destination IP address. This translation may occur by accessing a gatekeeper that is either public or operating within a private network and is masked from the requesting gateway. Once this address translation occurs, the voice connector 570 creates a virtual connection between the two network gateways 212(a), 222(a) by assigning a port or ports on which this VoIP communication will occur. Once these ports are assigned, this information is transmitted to the voice switch 585 and to the network gateways 212(a), 222(a). Sockets, an IP address and port number, are established between the different networking devices and the voice switch 585. Voice packets are then transmitted between the first and second gateways 212(a), 222(a) on these sockets.

The VoIP connection may also comprise networking devices that may adjust the connection configuration and port number assignments within the connection. For example, firewalls or other network servers having corresponding addresses and port numbers may be included to enhance security or add other functionality within the connection. Accordingly, the number of sockets may increase within the connection to facilitate the inclusion of these devices.

The voice switch 585 is able to identify these packets by extracting source information contained within the packet header. Specifically, the voice switch 585 extracts and analyzes the IP source address within the packet header in order to correctly switch the packet to the correct network gateway. This analysis may be done using a number of different methods. For example, the extracted IP source address may be compared to an IP address of either the first network gateway 212(a) or the second network gateway 222(a). If the extracted IP source address matches the compared network gateway address (address for gateway 212(a)), then the packet is forwarded accordingly (e.g., to gateway 222(a) with a new header having a source IP address of the voice router 500 and a destination IP address of gateway 222(a)). However, if the two addresses do not match, then packet is forwarded to the other network gateway (e.g., to gateway 212(a)) by default because only two possible destination gateways exist within the VoIP connection. Specifically, a buffer may be maintained within the voice switch 585 that maintains these two addresses to which a source address in a packet header is compared. Thus, the voice switch 585 is able to reduce the number of ports required to maintain a RTP VoIP connection and still maintain correct packet flow within this connection with the implementation of this novel address translation. This packet direction identification is discussed in greater detail below with reference to FIG. 9.

The voice switch 585 also reduces the number of RTCP ports on the VoIP connection. Specifically, all RTCP connections are aggregated onto a single port M 510. The RTCP protocol is a companion protocol to RTP and is used to provide control and quality of service data to various devices within a connection. There are typically less RTCP packets transmitted by a gateway than RTP packets. The functionality provided by RTCP data may be compensated, at least to a particular level, internally within the voice switch 585. Because so few RTCP packets are transmitted from a gateway and the lost functionality of discarded RTCP packets may be minimized by the voice switch 585, discarded RTCP packets typically do not have a significant effect on the quality of a VoIP connection using the voice switch 585.

The voice switch 585 discards RTCP packets after they are received on port M 510 in order to further reduce the port count of a VoIP connection. Because all RTCP connections are aggregated on a single port M 510, the number of available ports on the voice switch 585 drastically increases. It is important to note that the voice switch 585 needs to have at least one RTCP port 510 on which RTCP packets arrive. For example, if the voice switch 585 did not have the RTCP port 510, then bounce-backs or acknowledgements would be transmitted from the voice switch 585 to a gateway transmitting RTCP packets. This bounce-back or acknowledgement would signal the transmitting gateway that there are no available RTCP ports on the voice switch 585. This acknowledgement presents a security risk to the voice switch 585 and attached network because hackers would be able to listen to particular ports on the voice switch 585. Thus, the single aggregating RTCP stops this acknowledgement and increases security on the voice switch 585.

Figure 5B:
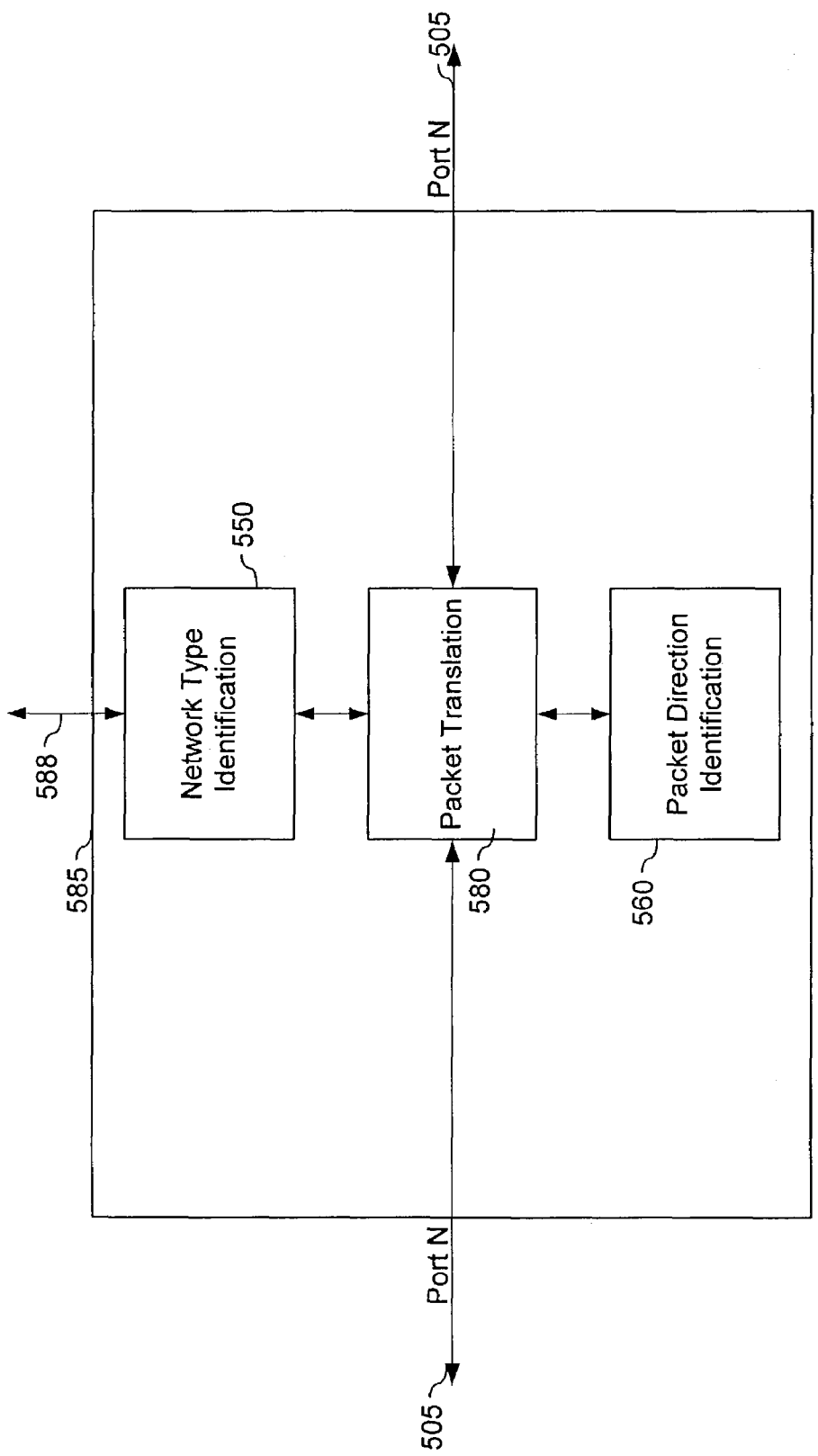
FIG. 5B is a block diagram of modules operating within a voice switch according to one embodiment of the present invention.

FIG. 5B illustrates hardware or software modules operating within the voice switch 585. These modules provide packet-forwarding functionalities to the voice switch 585 that reduce the number of ports required for a VoIP connection. According to this embodiment of the present invention, a packet is received on port N 505. The packet is transmitted through the voice switch 585 to a packet translation module 580. The packet translation module communicates with a network type identification module 550 and a packet direction identification module 560. The packet direction identification module 560 identifies the direction of a packet traveling on the bi-directional port N 505. One method for performing this direction identification is extracting the source address or destination port from a packet and comparing to the known source addresses or destination ports on the VoIP connection. These methods will be discussed in greater detail below.

The network type identification module 550 identifies a network type corresponding to a packet's destination gateway and source gateway. This identification also allows the voice switch 585 to ensure that the transmitted packet is compatible with the destination gateway (e.g., a packet is transmitted on the correct port number and to the correct destination port). There are multiple methods by which these gateways may be identified. First, this information may be embedded within header fields, such as port numbers, within the packet. Second, ports may be assigned according to the types of gateways in the VoIP connection. Both of these methods are described in greater detail below.

The packet translation module 580 receives information regarding the source and destination network types and the packet direction in order to correctly identify an appropriate packet translation operation(s). The packet translation module 580 ensures that the packet is transmitted on the correct port number so that it is compatible with the destination gateway. Specifically, the packet translation module 580 inserts the correct IP address of the destination gateway and the correct port number on the destination gateway within the packet header. The prior packet header may have been already discarded or be discarded by the packet translation module 580 prior to or after a new header is placed on the packet. These packet translation operations will be described in greater detail below.

Figure 5C:
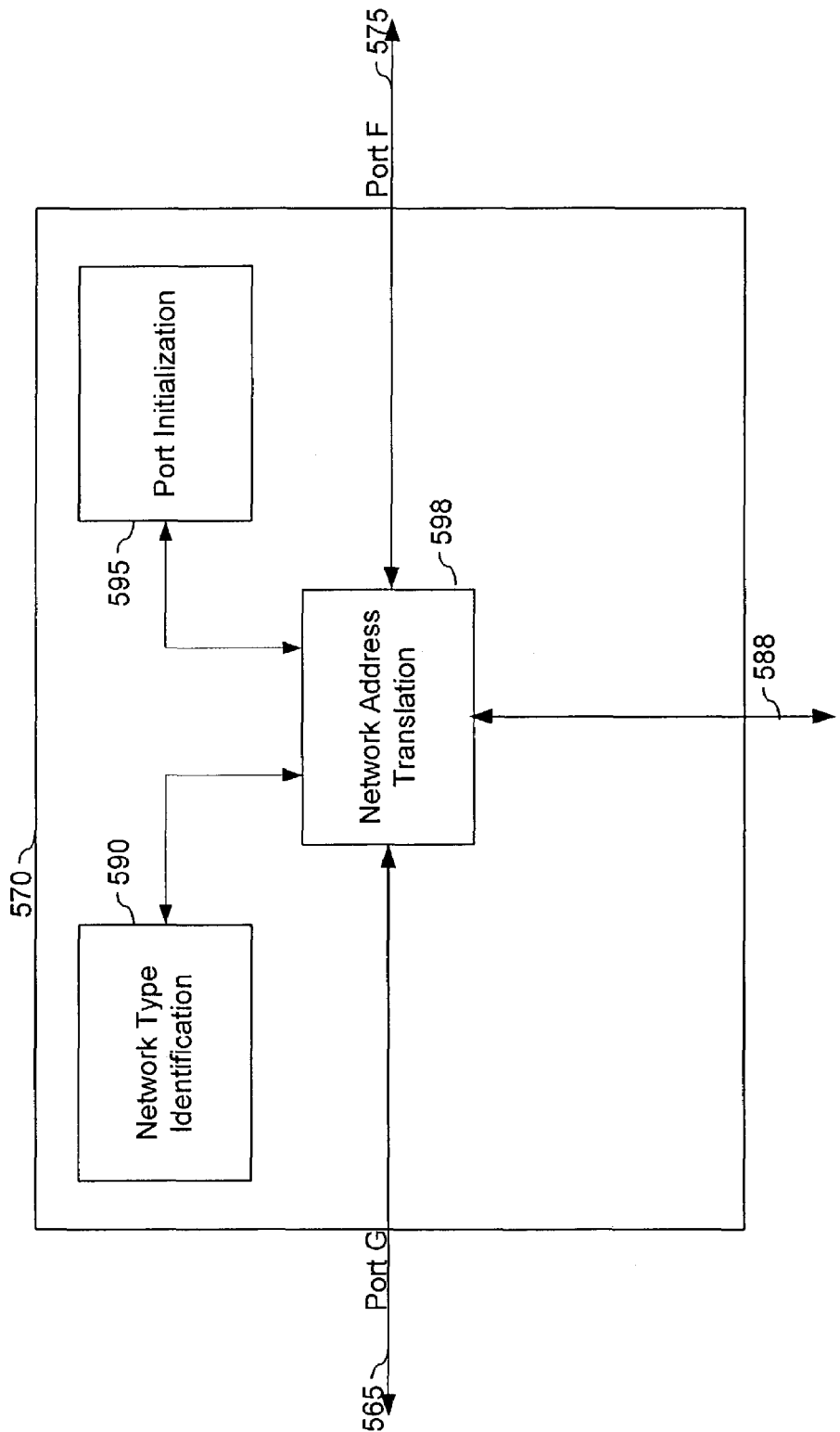
FIG. 5C is a block diagram of modules operating within a voice connector used to set up a VoIP connection according to one embodiment of the present invention.

FIG. 5C is a block diagram of a voice connector 570 used to establish a VoIP connection. As previously described, the voice connector 570 establishes a connection after receiving a call set-up request from a gateway. The voice connector 570 receives these requests on particular ports (e.g., ports F and G). In response to this request, the voice connector 570 creates a virtual path between the two gateways corresponding to the IP addresses of the two gateways 221, 222 and an assigned port(s) given to devices within this connection. The voice connector 570 assigns this port or ports corresponding to the connection and notifies networking devices within this connection of this port(s). As a result, packets may be forwarded by these devices on correct VoIP connections that are identified by a corresponding port(s).

A network address translation module 598 is implemented within the voice connector 570 to provide translation of a call set-up request in order to properly establish a VoIP connection. This translation may require accessing an external gatekeeper or may be done internally within the voice connector 570. As described above, the network address translation module 598 receives a request from a gateway 212 or 222 to make a connection. This request typically identifies the other side of the connection by a ten-digit telephone number or other identifying number. The network address translation module 598 uses a database to translate this ten-digit telephone number to an IP address. This translation may be done internally within the network address translation module 598 or may be done externally by addressing a public or private gatekeeper to translate the telephone number to an IP address. As a result of this process, the voice connector 570 will have identified the IP addresses of both the requesting gateway (i.e., from the call set-up request) and the destination gateway (i.e., from the above-described translation).

A port initialization module 595 within the voice connector 570 is used to assign ports to particular VoIP connections. The port initialization module 595 communicates with the network address translation module 598. In response to a VoIP connection request, the port initialization module 595 assigns a port or ports on which packets will travel between the two gateways. This port information is then transmitted to both gateways, for example, using port G 565 and port F 575, and the voice switch 585 via line 588. Accordingly, the voice switch 585 will be able to identify a packet by listening on a particular port(s). For example, the first and second gateways 212(*a*), 222(*a*) are told to transmit voice packets on port N 505 to the voice switch 585. This port information is also transmitted to the voice switch 585 along line 588. As a result, the voice switch 585 is able to identify packets within this particular connection by listening on port N 505.

The port initialization module 595 may assign these ports in relation to the types of networks on which the gateways 212, 222 reside. The port initialization module 595 may access a network type identification module 590 in order to assign ports from port ranges corresponding to the gateway type connections. For example, if the first gateway 212(*a*) is in a first type of network (e.g., Cisco, Clarent, etc.) then the port initialization module 595 may select a port from a range of ports (e.g., 3000-4000) corresponding to that first type of network. Thereafter, when voice packets are actually transmitted on these ports within the connection, the voice switch 585 can identify the type of gateway/network that transmitted the packet.

In another embodiment, the port initialization module 595 may assign these ports in relation to the physical locations of the gateways. For example, the network type identification module 590 may contain ranges of port values corresponding to physical locations of gateways. Thus, if the first gateway 212(*a*) is physically located in China, then the port initialization module 595 may select a port from a range of ports (e.g., 5000-6000) corresponding to that physical location. Thereafter, when voice packets are actually transmitted on the ports within the connection, the voice switch 585 can identify the physical location of the gateway/network that transmitted the packet.

Figure 5D:
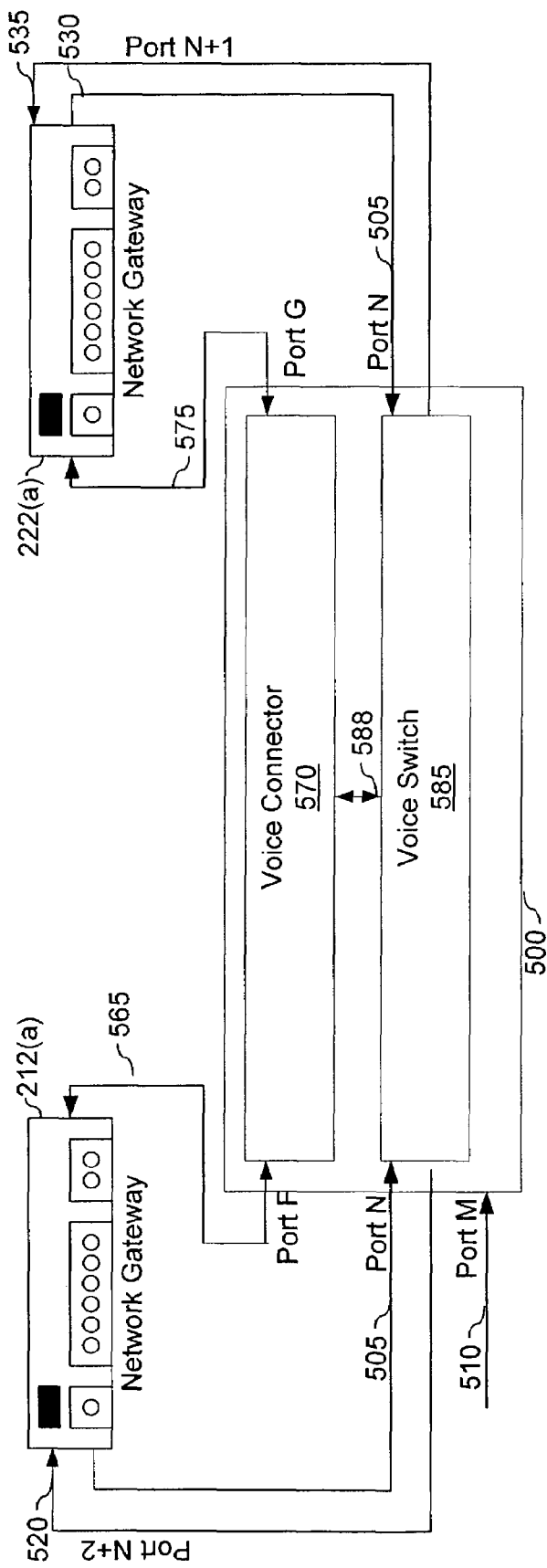
FIG. 5D is an illustration of a VoIP connection using a single voice router between two networks.

As described above, VoIP connections between multiple networks typically follow the H.323 standard. However, various interpretation of this standard by network service providers may present compatibility issues between two separate networks. For example, a Clarent H.323-based network may have difficulty directly mapping to a Cisco H.323-based network due to slight protocol variations between the two networks. For example, port assignment protocols between a Cisco H.323-based network and the voice switch 585 may differ from those between a Clarent H.323-based network and the voice switch 585. In such an occurrence, the voice switch 585 may perform an additional step within the packet translation operation (e.g., compensate for differing port assignment protocols) between the two networks in order to ensure proper communication. In order to correctly perform this translation, the voice switch 585 should identify both the network type from which the packet was sent and the network type to which the packet is destined. FIG. 5D illustrates an example of this network incompatibility and corresponding packet translation required for proper communication.

The first network gateway 212(a) resides on the first network 210 with corresponding first network type. This first type of network requires that H.323 compatible packets be transmitted from the first gateway 212(a) to the voice switch 585 on port N 505 and for H.323 compatible packets to be transmitted from the voice switch 585 to the first gateway 212(a) on port N+2 520. In comparison, the second network gateway 222(a) resides on the second network 220 with corresponding second network type. This second type of network requires that H.323 compatible packets be transmitted from the second gateway 222(a) to the voice switch 585 on port N 505 and for H.323 compatible packets to be transmitted from the voice switch 585 to the second gateway 222(a) on port N+1 535. Thus, although both the first and second networks follow the H.323 standard, differing interpretations of this standard have led to different port assignment procedures between the two networks. In order to compensate for this difference, the voice switch 585 of the present invention is able to identify these slight variations between networks when both assigning port numbers during the call set-up procedure and packet switching as the telephone call is occurring.

The voice switch 585 is able to compensate for these variations between networks and properly translate packets between the two networks within the connection (e.g., transmit a packet on the appropriate port number to a network). First, the voice switch 585 identifies the direction of a packet within a connection (i.e., identifies a destination address for the packet). Second, the voice switch 585 identifies the type of network to which a packet is destined. This information allows the voice switch 585 to ensure that a packet transmitted from the voice switch 585 is compatible with the network to which the packet is destined. Moreover, the present invention also reduces the number of ports used from 4 to 3 as compared with the prior art.

b) Network Type Identification

As described above, the voice router 500 needs to be aware of the types of networks in this VoIP connection in order to ensure that proper packet translation occurs. Once the types of the two networks are identified, an appropriate packet translation may be retrieved and performed accordingly.

(i) Network Type Internal Table

A first method that may be used to identify network types is embedding a network type identifier within a port number found in the packet header. FIG. 6A shows one method for embedding a network type identifier. A sixteen-bit port number field 600 contained within a header is shown. This field 600 is segmented into three sub-fields: a first bit mask 610, and second bit mask 620, and a port value field 630. The first and second bit masks 610, 620 are two-bit values. The port value field 630 is a twelve-bit field having a range of about 4000 values.

During the set-up of the VoIP connection, addressing information is gathered and the IP addresses and types of the first and second networks are determined. Thereafter, the two IP addresses are compared to identify the smaller IP address and the larger IP address. The comparison provides an order in which the network type identifiers corresponding to the two networks will be inserted within the port number 600. A first bit mask is inserted in the first two-bit field 610. The second bit mask is inserted in the second two-field 620. Thus, when the voice switch 585 extracts these two bit masks; it will be able to associate each identifier to a particular network through the position (e.g., field 610 or 620) from which the identifier was taken. For example, the first bit mask 610 contains network type information for the smaller IP addressed network and the second bit mask 620 contains network type information for the larger IP addressed network. Thereafter, a port value is assigned and inserted within the port value field 630. The port number 600 for the packet is the combination of these three fields. The port number 600 is inserted within the packet header and the packet is transmitted to the voice switch 585. This process results in reducing the number of available ports per voice switch 585 on which packets may be transmitted, however, the resulting reduction in the number of ports per connection on the voice switch 585 more than compensates for this reduction.

The voice switch 585 extracts this port number 600 from the packet header after receiving the packet on a corresponding port. From this port number 600, the network type information within the first and second network type identifiers 610, 620 is removed and analyzed. From this information, the voice switch 585 is able to identify the network types of both networks within the VoIP connection. According to the example discussed above, the voice switch 585 extracts the network type information from the first network type identifier 610 and assigns this network type to the network with the smaller IP address. The information within the second network type identifier 620 is extracted and assigned to the network with the larger IP address. Thereafter, a corresponding packet translation operation is performed on the packet prior to transmission to the destination network gateway. For example, a destination IP address may be inserted into the header, the port number may be incremented by 2, and the packet is transmitted from the voice switch 585 to a destination gateway. As a result of this process, variations within H.323 networks are compensated for by the single voice switch 585 between the two networks.

The voice switch 585 requires some method of interpreting the information within the network type identifiers 610, 620 in order to properly translate addresses on the packets. According to one embodiment of the invention, a network type identifier table may be used. An example of a network type identifier table of network type identifiers is also shown in FIG. 6B. This example describes a two-bit network type identifier that is limited to four network types that may be identified. This range may be increased by increasing the number of bits within one or both of the network type identifiers 610, 620. However, as the number of bits within the network type identifiers 610, 620 increases, the range of available port numbers is reduced. The unavailable port numbers reserved for non-identified network types within this sixteen-bit port number cause this reduction.

(ii) Pre-Defined Port Range Representing a Network Type

A second method for identifying the network types within a VoIP connection provides that port numbers are assigned according to the two types of networks within the connection. This method begins at the call set-up stage during which the port numbers, on which packets will travel in a VoIP connection, are assigned. As with the first method, after both IP addresses of the two gateways are identified, they are compared and smaller and larger IP addresses are determined. A network pair table 700A is maintained within the voice connector 570 that relates port ranges to VoIP connections between network types. An example of such a network pair table 700A is illustrated in FIG. 7A. This table 700A provides a range of available port numbers according to a network type of the gateway having the smaller IP address and a network type of the gateway having the larger IP address. In one embodiment, the table includes four columns. A first column 710 identifies the network type of the smaller IP addressed gateway. A second column 720 identifies the network type of the larger IP addressed gateway. A third column 730 identifies a starting value of a port range corresponding to the gateway types identified in the first column 710 and the second column 720. A fourth column 740 identifies either an ending value for this port range or a length for the port range. For example, a VoIP connection involving two gateways having the same network type could be assigned a port number within the range of 1000 to 2000. Comparatively, a VoIP connection involving a first gateway having a first network type and a second gateway having a second network type could be assigned a port number within a range of 3000 to 4000.

During the set-up of the VoIP connection, the types of the networks are identified and a port number is assigned by the voice connector 570 according to these ranges defined within the network pair table 700A. This assigned port number is transmitted to the voice switch 585 and both gateways so that traffic between the two gateways may be forwarded correctly.

The network pair table 700A is also transmitted to the voice switch 585 if the voice switch 585 does not have the table 700A or the voice switch 585 has an old version of the table 700A. It is important for the voice switch 585 to have a current version of the table so that the both gateway types may be properly identified from the port on which a packet arrives. As a result of this network pair table 700A, the voice switch 585 is able to identify the network types of both the larger and smaller IP addressed gateways by identifying the port range corresponding to the port used for packet transmission. For example, a VoIP connection is set-up between the first network gateway 212(a) and the second network gateway 222(a). Both gateways 212(a), 222(a) transmit packets on the same port, port N, to the voice switch 585. The voice switch 585 is able to identify the type of both gateways 212(a), 222(a) by comparing the port on which a packet arrives to the network pair table 700A shown in FIG. 7A. The voice switch 585 identifies a port range within the table 700A corresponding to the port number and identifies the gateway type of both gateways. Specifically, the network type of the gateway with the smaller IP address is extracted from column 710 and the network type for the gateway with the larger IP address is extracted from column 720.

It is important to note that the network pair table 700A may be continually updated by the voice connector 570 simply through re-transmission to the voice switch 585. Also, the size of the network pair table 700A may be adjusted according to the number of different types of networks that use the voice switch 585 for VoIP connections. Also, the port ranges may be adjusted relative to the frequency of VoIP connections occurring between certain types of networks. For example, if VoIP connections between two types of networks occur very frequently, the port range corresponding to this connection may be increased to more efficiently accommodate these connections.

FIG. 7B is an illustration of an exemplary network type table for associating an IP address with a network type. The network type table 700B maintains state information about the network types with which the voice router is communicating. In the illustrated embodiment, a data record includes source IP address 760 and network type 762. The source IP address 760 identifies the gateway on a particular network and the network type 762 identifies the type of network on which the gateway operates. For example, record 764 indicates that gateway (3) is network type (4). The network types can be predefined or dynamically assigned during operation. For example, the voice router 500 may use network type 4 to correspond to a Cisco-type network. One skilled in the art will recognize that the network pair table 700A or the network type table 700B may be used to identify a network type so that the voice router 500 can perform packet translation or provide other services. Therefore, reference numeral 700 as used herein refers to the network pair table 700A or the network type table 700B.

Figure 8A:
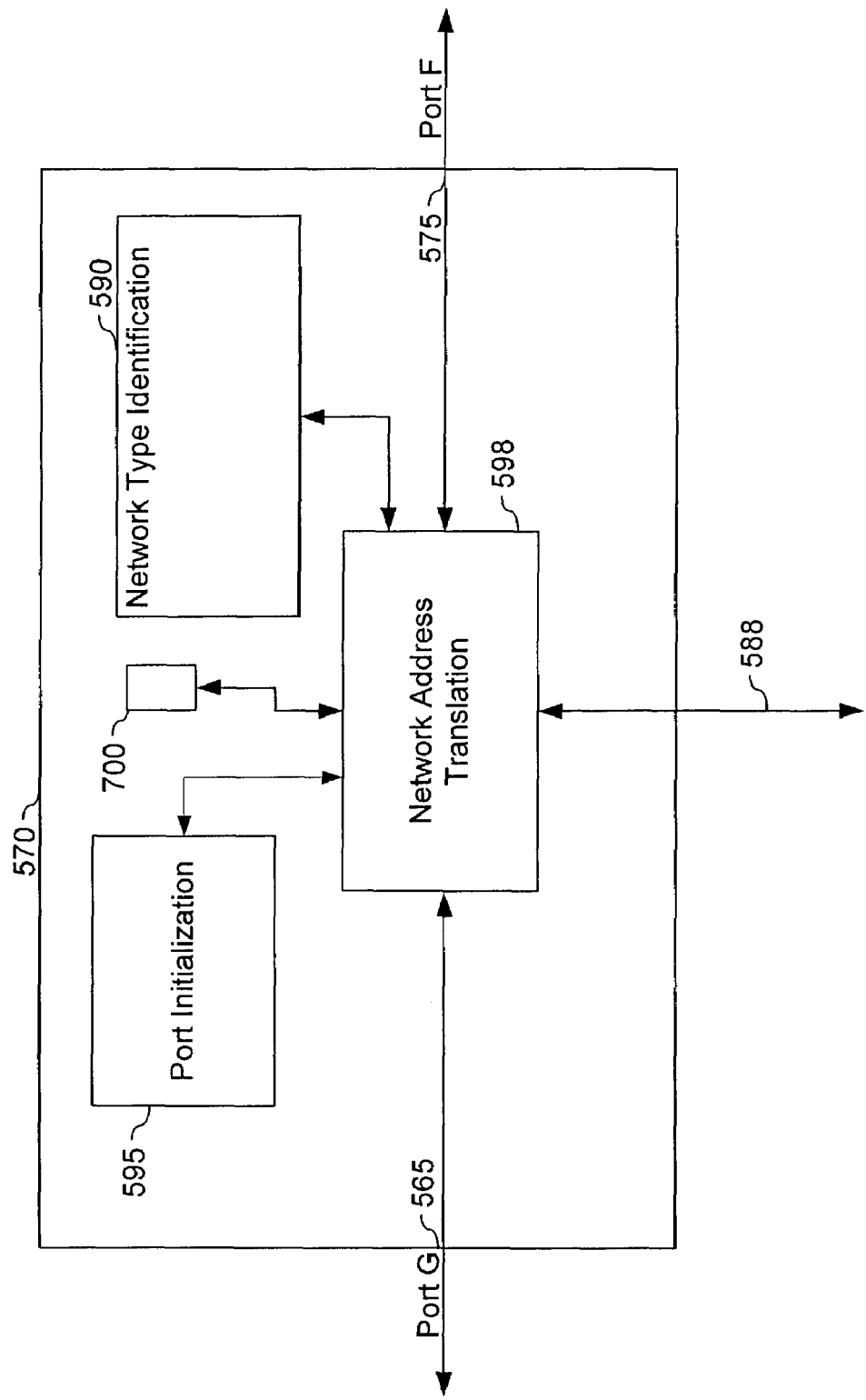
FIG. 8A is a block diagram of a voice connector containing the network pair table.

FIG. 8A shows a block diagram of an embodiment of the voice connector 570 in which the network pair table 700 is used. Gateways, such as the first and second gateway 212(a), 222(a), may transmit call set-up requests on ports F 565 or G 575. According to this embodiment, the network type identification module 590 includes the network pair table 700. The network type identification module 590 accesses this table 700 in order to identify the types of the gateways within a desired connection. This information is then transmitted to the port initialization module 5.95 whereupon ports for the connection are assigned and transmitted to the gateways and/or voice switch 585.

Figure 8B:
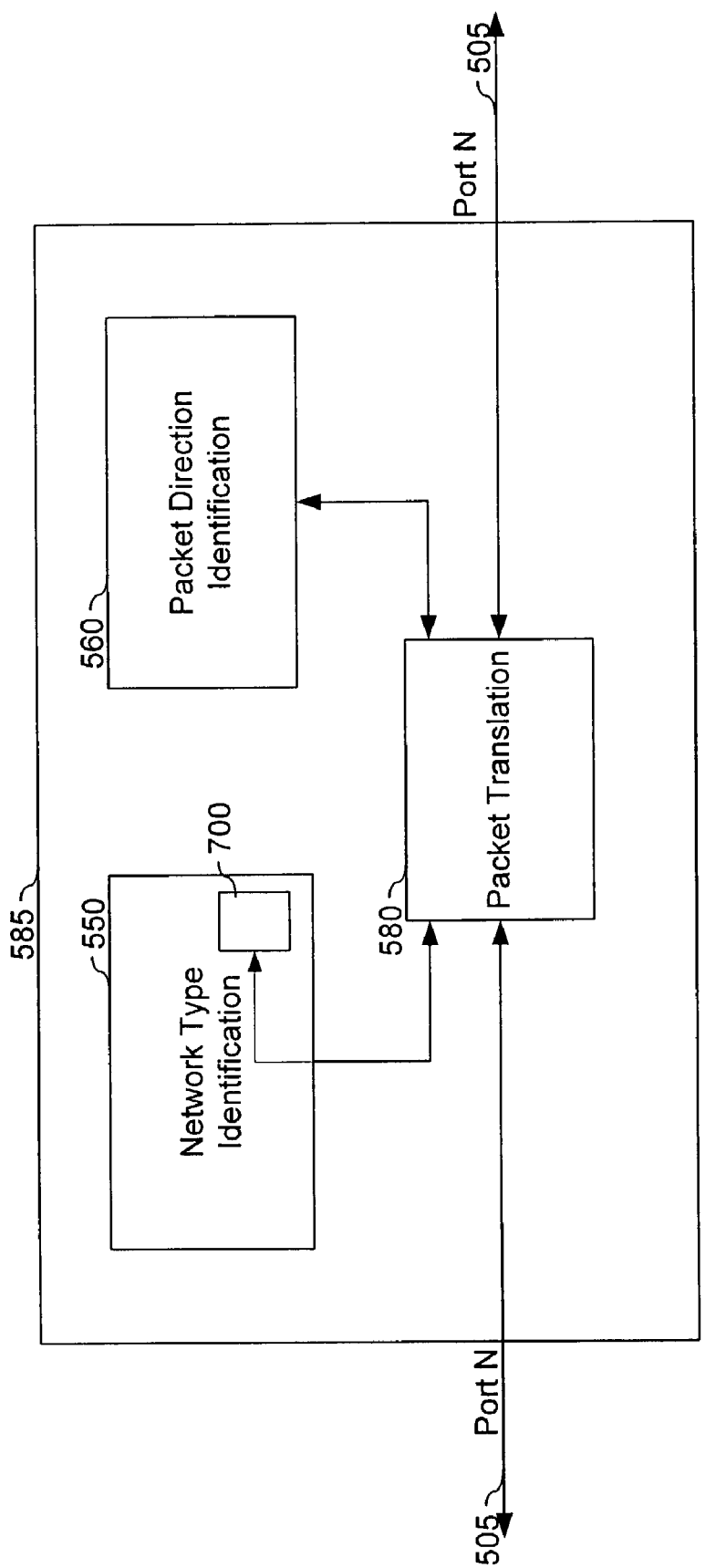
FIG. 8B is a block diagram of a voice switch containing the network pair table.

FIG. 8B shows a block diagram of an embodiment of the voice switch 585 in which the network pair table 700 is used. After the call set-up procedure is finished and a port is defined for a connection, voice packets between the first and second gateways 212(a), 222(a) may be transmitted. However, as described above, in order for proper translation to occur within the voice switch 585, the destination gateway type should be identified. This identification allows the voice switch 585 to properly transmit the packet onto a correct port to a destination gateway. According to an embodiment of the present invention, the network type identification module 550 may implement the network pair table 700 to perform this gateway type identification. Specifically, the network type identification module 550 identifies the port on which a packet arrives. From this port number, a port range is identified within the table 700 and gateway types for both gateways are identified as previously described. However, in order to complete the translation and transmit the packet on to the correct destination, the direction of the packet needs to be identified because both gateways are transmitting on the same port.

c) Packet Direction Identification

In addition to identifying the network types of both the first and second gateway 212(a), 222(a), the voice switch 585 identifies the direction a packet is traveling. This direction information allows the voice switch 585 to properly switch a packet to a correct destination address because both the first and second gateways 212(a), 222(a) are transmitting packets to the voice switch 585 on the same port (e.g., port N).

Figure 9:
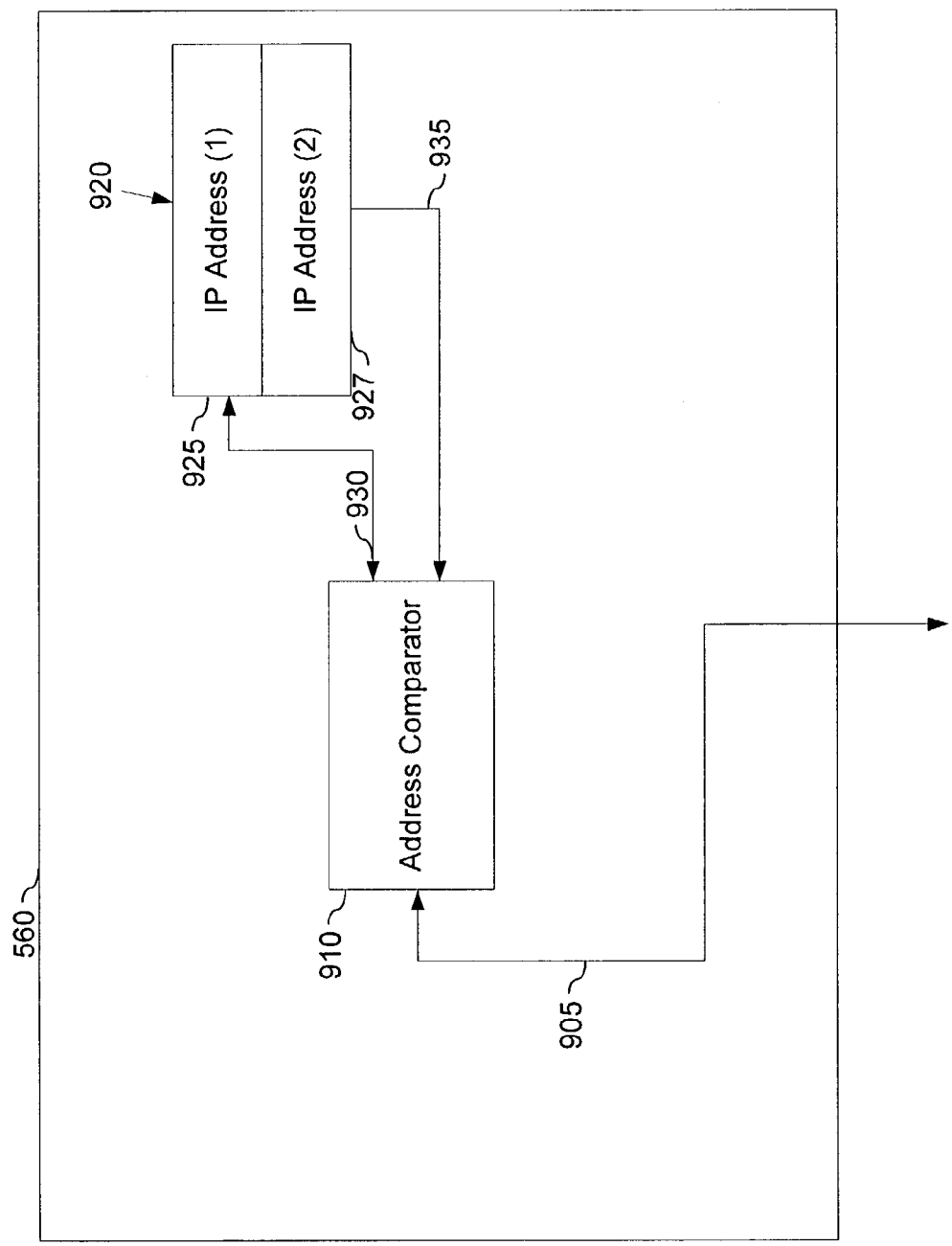
FIG. 9 is a block diagram of a packet direction identification module according to an embodiment of the present invention.

FIG. 9 illustrates an embodiment of a packet direction identification module 560 according to the present invention. A source IP address is removed from an incoming packet and transferred to an address comparator 910 via line 905. The address comparator 910 may be implemented in hardware, software, or firmware. The address comparator 910 is coupled to a buffer that stores the IP address of both gateways (e.g., 212(a), 222(a)) within a connection. One method for storing these IP addresses is to extract the source address from the first packet from each gateway. These two IP addresses are then stored within the buffer 920.

The buffer 920 comprises a first storage element 925 and a second storage element 927. The buffer 920 can implement a toggle for storing and for comparing the IP addresses. After receiving the source IP address from a packet that arrived on a particular port, the address comparator 910 compares this source address to the address within the first storage element 925. If this source IP address matches the IP address within the first storage element 925, the buffer 920 transmits the address in the second storage element 927 to the address comparator 910 via line 935. This address from the second storage element 927 is the destination address for the gateway in the connection to which the packet should be forwarded. This address is inserted into the header of the packet so that it may be forwarded to the correct gateway in the connection.

Comparatively, if the source IP address from a packet does not match the address in the first storage element 925, then the address in this first storage element 925 is transmitted back to the address comparator 910 via line 930. This address from the first storage element 925 is the destination address for the gateway in the connection to which the packet should be forwarded. The source IP address from the packet is stored within the first element 925 and the IP address that had previously been stored in the first storage element is transferred and stored in the second storage element 927. As a result, both IP addresses in the connection are continually stored within the buffer 920. The buffer 920, therefore, toggles the addresses when the source IP address does not match the address stored in the first storage element 925. If the buffer 920 is implemented as a stack, then the source IP address can be pushed onto the stack when there is no match in with the first storage element 925 (i.e., the head of the stack).

After a destination address is identified and a network type for both gateways has been determined, information is inserted into the packet header. For example, a new destination IP address and port number are inserted into the packet header. Thereafter, the packet is transmitted from voice switch 585 to a gateway (e.g., 212(*a*) or 222(*a*)) on a particular port.

d) Method for Translating a Network Address Within a Connection

Figure 10:
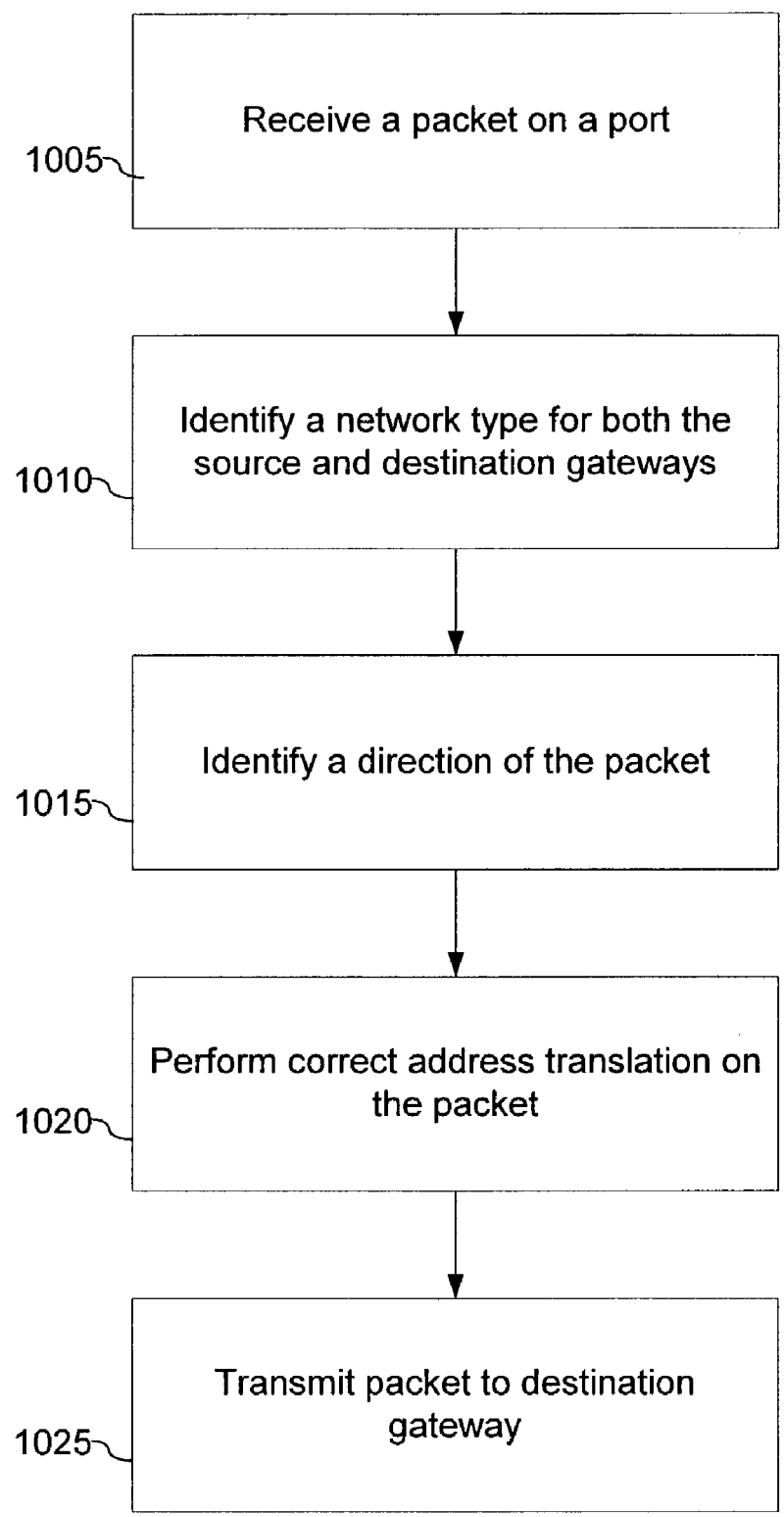
FIG. 10 is a flowchart of a network address translation operation according to an embodiment of the present invention.

FIG. 10 illustrates a general method for network address translation according to an embodiment of the present invention. A voice switch 585, operating within an established network connection, receives 1005 a packet on a corresponding port. The voice switch 585 identifies 1010 a network type for both gateways within the connection. This identification may be done by numerous methods. For example, as described above, network type information may be integrated within the port number found in the packet header. Also, network type information may be identified by determining a port range in which the port falls, and from the port range, identify network type information corresponding to this particular port range.

The voice switch 585 identifies 1015 a direction of the packet or destination address to which the packet should be forwarded. This identification may be accomplished using numerous methods. For example, as described above, a buffer and comparator may be implemented whereby a destination address is determined using the source address within the packet header. Once both network type information and a packet direction have been determined, the voice switch 585 performs 1020 an appropriate address translation on the packet. Thereafter, the packet is transmitted 1025 to a correct gateway in the connection.

While the present invention has been described with reference to certain preferred embodiments, those skilled in the art will recognize that various modifications may be provided. Variations upon and modifications to the preferred embodiments are provided for by the present invention, which is limited only by the following claims.

We claim:

1. A network address translator for interfacing a first network and a second network, the network address translator comprising:
   a voice connector configured to identify network type information corresponding to the first network and the second network and comprising a port initialization module configured to:
   receive a call setup message from the first network;
   provide routing information for the second network; and
   assign a port for communications with at least one of the first network and the second network and wherein the port is assigned within a predetermined range corresponding to the network type information; and
   a voice switch coupled to the voice connector configured to translate a packet using the network type information.

2. The network address translator of claim 1 wherein the routing information includes at least one of a network address and a port number.

3. The network address translator of claim 1 wherein the port initialization module is further configured to assign a port tuple for communications between the first network and the second network.

4. The network address translator of claim 1 wherein the voice connector further comprises:
   a network pair table configured to store port configuration corresponding to the network type information.

5. The network address translator of claim 1 wherein the voice connector further comprises:
   a network type table configured to associate a network type with a gateway operating on at least one of the first and the second networks.

6. The network address translator of claim 1 wherein the voice switch further comprises:
   a packet translation module configured to adjust the packet for transmission from the first network to the second network; and
   a network type identification module coupled to the packet translation module configured to identify the network type information.

7. The network address translator of claim 6 wherein the packet translation module translates Real Time Protocol ('RTP') packets traveling between the first network and the second network.

8. The network address translator of claim 6 wherein the network type identification module is further configured to identify network type information based on a port number.

9. The network address translator of claim 6 wherein network type information for the first network is extracted from a first field in the port number and network type information for the second network is extracted from a second field in the port number.

10. The network address translator of claim 1 wherein the voice switch masks the address of a first gateway on the first network from a second gateway on the second network.

11. The network address translator of claim 1 wherein the voice switch masks the address of a second gateway on the second network from a first gateway on the first network.

12. A network address translation method for connections between a first network and a second network, the method comprising:
   receiving a packet from the first network;

identifying a network type corresponding to the first network;

determining a second network to which the packet should be forwarded;

identifying a network type corresponding to the second network;

translating the packet so that it may be transmitted to the second network;

receiving a call setup message from the first network and to provide routing information for the second network; and assigning, within a predetermined range corresponding to the network type information, a port for communications with at least one of the first network and the second network.

13. The network address translation method of claim 12 further comprising:

assigning a port tuple for communications between the first network and the second network, wherein the port tuple includes a RTP stream and a RTCP stream.

14. The network address translation method of claim 12 wherein the translating further comprises:

adjusting a RTP packet traveling between the first and second networks.

15. The network address translation method of claim 12 further comprising:

masking the address of a first gateway on the first network from a second gateway on the second network.

16. The network address translation method of claim 12 wherein the network type of one of the first and second networks is identified based on a port number.

17. The network address translator method of claim 12 wherein network type information for the first network is extracted from a first field in the port number and network type information for the second network is extracted from a second.

* * * * *